United States Patent
Fukuda et al.

(10) Patent No.: US 9,525,990 B2
(45) Date of Patent: Dec. 20, 2016

(54) CORDLESS TELEPHONE EQUIPMENT AND CORDLESS TELEPHONE SYSTEM

(71) Applicant: Panasonic Intellectual Property Management Co., Ltd., Osaka (JP)

(72) Inventors: Hikaru Fukuda, Fukuoka (JP); Eiichi Hatae, Fukuoka (JP); Satoshi Ando, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/340,288

(22) Filed: Jul. 24, 2014

(65) Prior Publication Data

US 2015/0036671 A1 Feb. 5, 2015

(30) Foreign Application Priority Data

Jul. 31, 2013 (JP) ................................ 2013-158992

(51) Int. Cl.
*H04L 29/06* (2006.01)
*H04W 4/18* (2009.01)
(Continued)

(52) U.S. Cl.
CPC ........... *H04W 4/18* (2013.01); *H04M 1/72502* (2013.01); *H04W 8/02* (2013.01);
(Continued)

(58) Field of Classification Search
CPC ...... H04L 65/1046; H04L 67/16; H04L 12/66; H04M 7/0075; H04M 7/006
See application file for complete search history.

(56) References Cited

U.S. PATENT DOCUMENTS 8,223,950 B2 7/2012 Nogawa
8,654,960 B2 2/2014 Nogawa
(Continued)

FOREIGN PATENT DOCUMENTS

EP 2 129 087 A1 12/2009
JP 6-152512 A 5/1994
(Continued)

OTHER PUBLICATIONS

Extended European Search Report dated Dec. 5, 2014, for corresponding EP Application No. 14178226.8-1972, 10 pages.

*Primary Examiner* — Fan Ng
(74) *Attorney, Agent, or Firm* — Seed IP Law Group LLP

(57) ABSTRACT

Disclosed is cordless telephone equipment allowing various kinds of data stored in a mobile telephone to be stored in a cordless handset in a state usable therein, without provision of a new device thereto. A handset transfer-data conversion section that executes a predetermined conversion process according to a type of handset transfer-data stored in a storage section. Specifically, the handset transfer-data conversion section converts an audio format of ringtone data according to a use CODEC of a cordless handset. In addition, the handset transfer-data conversion section converts an image size of wallpaper data into a size reproducible in the cordless handset. Further, the handset transfer-data conversion section converts an image size of image data of the other party included in telephone directory data into a size reproducible in the cordless handset.

16 Claims, 10 Drawing Sheets

(51) Int. Cl.
  *H04M 1/725*    (2006.01)
  *H04W 8/02*     (2009.01)
  *H04M 1/2745*   (2006.01)
  *H04W 84/12*    (2009.01)

(52) U.S. Cl.
  CPC .. *H04M 1/274516* (2013.01); *H04M 2250/06* (2013.01); *H04M 2250/08* (2013.01); *H04M 2250/64* (2013.01); *H04W 84/12* (2013.01)

(56) References Cited

U.S. PATENT DOCUMENTS

| | | |
|---|---|---|
| 2004/0242216 A1* | 12/2004 | Boutsikakis ............... 455/418 |
| 2005/0014490 A1* | 1/2005 | Desai et al. ............... 455/416 |
| 2006/0025148 A1* | 2/2006 | Karaoguz ............ H04H 20/57 |
| | | 455/452.2 |
| 2007/0025531 A1 | 2/2007 | Lin |
| 2007/0135077 A1 | 6/2007 | Yamane et al. |
| 2009/0061850 A1 | 3/2009 | Li et al. |
| 2009/0296917 A1 | 12/2009 | Nogawa |
| 2012/0257732 A1 | 10/2012 | Nogawa |

FOREIGN PATENT DOCUMENTS

| | | |
|---|---|---|
| JP | 2003-23476 A | 1/2003 |
| JP | 2003-101632 A | 4/2003 |
| JP | 3116750 U | 12/2005 |
| JP | 2007-79639 A | 3/2007 |
| JP | 2007-164500 A | 6/2007 |
| JP | 2009-55132 A | 3/2009 |
| JP | 2010-278529 A | 12/2010 |
| WO | 2004/110041 A1 | 12/2004 |

\* cited by examiner

| CONNECTION STATE | | HANDSET NUMBER | IMAGE SIZE | USE CODEC |
|---|---|---|---|---|
| HANDSET A | CONNECTED | 11 | QVGA (VERTICAL × HORIZONTAL: 240 × 320 pic) | G.722 |
| HANDSET B | CONNECTED | 12 | QVGA (VERTICAL × HORIZONTAL: 240 × 320 pic) | G.722 |
| HANDSET C | DISCONNECTED | 13 | QVGA (VERTICAL × HORIZONTAL: 240 × 320 pic) | G.722 |
| HANDSET D | CONNECTED | 14 | QVGA (VERTICAL × HORIZONTAL: 240 × 320 pic) | G.722 |
| HANDSET E | DISCONNECTED | 15 | QVGA (VERTICAL × HORIZONTAL: 240 × 320 pic) | G.722 |
| HANDSET F | (NON-REGISTERED) | — | | |

FIG. 3

CORDLESS TELEPHONE EQUIPMENT AND CORDLESS TELEPHONE SYSTEM

TECHNICAL FIELD

The present invention relates to cordless telephone equipment connected by radio to a mobile telephone including a wireless local area network (LAN) communication unit, and also relates to a cordless telephone system including the cordless telephone equipment.

BACKGROUND ART

In recent years, a variety of Internet services such as Web browsing and IP telephone services under a wireless LAN environment at home or at an office (hereunder, referred to as "in home") by using mobile telephones configured to connect to a mobile telephone network (including so-called "smartphone") have become available. These mobile telephones are provided with a wireless LAN communication unit (Wi-Fi (registered trademark) function that conforms to the IEEE 802.11 standards) and thus configured to connect to the Internet under the wireless LAN environment.

Meanwhile, Japanese Utility Model No. 3116750 (hereinafter, referred to as PTL 1) and Japanese Patent Application Laid-Open No. 2003-101632 (hereinafter, referred to as PTL 2), for example, disclose a technique for connecting by radio a mobile telephone with another telephone such as a cordless telephone handset (hereafter referred to as "cordless handset") used at home and then transferring various kinds of data (e.g., telephone directory data, wallpaper data, and ringtone data) held in the mobile telephone to the other telephone. Note that, the ringtone data may be sound source data used in a cordless handset, such as a holding tone or a guidance message of an answering machine.

PTL 1 discloses a telephone capable of coupling an external storage apparatus (for example, a mobile telephone) to the telephone, reading an audio file from the external storage apparatus, and freely changing a ringtone.

PTL 2 discloses a telephone directory data transfer system that connects a mobile telephone and an extension telephone (or a general subscriber telephone) and allows telephone directory data to be transferred between these telephones.

CITATION LIST

Patent Literature

PTL 1
Japanese Utility Model Registration No. 3116750
PTL 2
Japanese Patent Application Laid-Open No. 2003-101632

SUMMARY OF INVENTION

Technical Problem

The cordless telephone system disclosed in PTL 1, however, requires the telephone to be provided with a host device controller (HDC) in order for the telephone to be coupled with an external storage apparatus. Moreover, cordless telephone equipment that connects a plurality of cordless handsets to a base unit requires each of the cordless handsets to be provided with a new HDC, which leads to an increase in costs.

Further, when a personal computer or a mobile telephone is used as the external storage apparatus disclosed in PTL 1, audio data recorded and saved by such an apparatus has an audio format such as an MPEG Audio Layer-3 (MP3) format or a WAV format, so that such audio data cannot be reproduced using CODEC of the codeless handset without conversion. In general, cordless handsets employ a CODEC that converts digital audio data of a PCM data format of a standard such as G.722 or G.711 into an analog sound. For this reason, when audio data of the MP3 format or WAV format is transmitted to the cordless handset, the cordless handset needs to convert the format of the audio data into a format that allows CODEC to reproduce the audio data. The execution of such a conversion process degrades the processing capability of each cordless handset, and leads to an increase in costs.

Meanwhile, the telephone system disclosed in PTL 2 requires an interface that allows the cordless handset to directly communicate with the mobile telephone. In addition, telephone directory data of mobile telephones includes a large volume of image data such as a face photograph generated according to the capability of a high-resolution liquid crystal display of recent mobile telephones as well as text data such as telephone numbers and name information. For this reason, a cordless handset including a liquid crystal display different from that of a mobile telephone cannot display the image data without conversion. In high-resolution mobile telephones, image data (for example, JPEG) of SVGA (800×600 pixels) or XGA (1024×768 pixels) is used. Meanwhile, in general cordless handsets, QVGA (320×240 pixels) or VGA (640×480 pixels) is used. For this reason, when image data stored in a mobile telephone is transmitted to a cordless handset, the cordless handset needs to resize image data to a size that is displayable on a liquid crystal display. The execution of such a conversion process degrades a processing capability of each cordless handset, and leads to an increase in costs.

The present invention has been made in consideration of the circumstances described above, and an objection of the present invention is thus to provide cordless telephone equipment and a cordless telephone system that allow various kinds of data stored in a mobile telephone to be stored in a cordless handset in a state usable in the cordless handset, without provision of a new device to the cordless handset.

Solution to Problem

Cordless telephone equipment according to an aspect of the present invention includes: at least one handset; and a base unit of the handset, wherein the base unit is connected to a wireless IP-terminal via a wireless LAN, the wireless IP-terminal instructing the base unit to transfer handset transfer-data including image data or music data to the handset, wherein the base unit comprises: a wireless LAN interface section that transmits and receives packet data to and from the wireless IP terminal; a handset transfer-data reception section that receives handset transfer-data including transfer-destination handset information from the wireless IP-terminal via the wireless LAN interface section and that stores the handset transfer-data in a storage section, the transfer-destination handset information indicating a transfer-destination handset number; a transfer-destination handset determination section that determines a transfer-destination handset of the handset transfer-data based on the transfer-destination handset information of the handset transfer-data stored in the storage section; a handset transfer-data conversion section that converts the handset transfer-data into a data format usable in the transfer-destination handset according to a data type of the handset transfer-data;

and a handset transfer-data transmission section that transmits the handset transfer-data that has been subjected to the conversion, to all transfer-destination handsets extracted by the transfer-destination handset determination section.

A cordless telephone system according to an aspect of the present invention includes: cordless telephone equipment including at least one handset, and a base unit of the handset; and a wireless IP-terminal that is connected to the base unit via a wireless LAN, wherein the wireless IP-terminal comprises: a first wireless LAN interface section that transmits and receives packet data to and from the base unit; a handset transfer-data selection section that selects handset transfer-data to be transferred to the handset, from among image data and music data stored in a first storage section; a transfer-destination handset selection section that selects at least one handset as a transfer-destination of the handset transfer-data; and a handset data transmission section that instructs the base unit to transfer handset transfer-data to a handset, by editing the handset transfer-data in such a way that the handset transfer-data includes transfer-destination handset information indicating a number of the handset selected by the transfer-destination handset selection section, and transmitting the edited transfer-destination handset information to the base unit, the base unit comprises: a second wireless LAN interface section that transmits and receives packet data to and from an external wireless IP-terminal; a handset transfer-data reception section that receives the handset transfer-data from the wireless IP-terminal via the second wireless LAN interface section and that stores the handset transfer-data in a second storage section; a transfer-destination handset determination section that determines a transfer-destination handset of the handset transfer-data based on the transfer-destination handset information of the handset transfer-data stored in the second storage section; a handset transfer-data conversion section that converts the handset transfer-data into a data format usable in the transfer-destination handset according to a data type of the handset transfer-data; and a handset transfer-data transmission section that transmits the handset transfer-data that has been converted by the handset transfer-data conversion section to all transfer-destination handsets extracted by the transfer-destination handset determination section.

A cordless telephone system according to an aspect of the present invention includes: cordless telephone equipment including at least one handset, and a base unit of the handset; and a wireless IP-terminal that is connected to the base unit of the cordless telephone equipment via a wireless LAN, wherein the wireless IP-terminal comprises: a first wireless LAN interface section that transmits and receives packet data to and from the base unit; a handset transfer-data selection section that selects handset transfer-data to be transferred to the handset, from among data stored in a first storage section; a transfer-destination handset selection section that selects at least one handset as a transfer-destination of the handset transfer-data; a handset transfer-data conversion section that converts the handset transfer-data into a state usable in the transfer-destination handset; and a handset data transmission section that edits the handset transfer-data that has been converted by the handset transfer-data conversion section in such a way that the handset transfer-data includes transfer-destination handset information indicating a number of the handset selected by the transfer-destination handset selection section, and that transmits the edited handset transfer-data to the base unit, and the base unit comprises: a second wireless LAN interface section that transmits and receives packet data to and from an external wireless IP-terminal; a handset transfer-data reception section that receives the handset transfer-data from the wireless IP-terminal via the second wireless IAN interface section and that stores the handset transfer-data in a second storage section; a transfer-destination handset determination section that determines a transfer-destination handset of the handset transfer-data based on the transfer-destination handset information of the handset transfer-data stored in the second storage section; and a handset transfer-data transmission section that transmits the handset transfer-data determined by the transfer-destination handset determination section.

According to the present invention, a predetermined conversion process is performed on various kinds of data in a base unit or a mobile telephone, and thus various kinds of data stored in a mobile telephone can be stored in a cordless handset in a state usable in a cordless handset without installing a new apparatus in a cordless handset.

BRIEF DESCRIPTION OF DRAWINGS

FIG. 3 is a diagram illustrating an exemplary handset information table;

DESCRIPTION OF EMBODIMENT

Hereinafter, an embodiment of the present invention will be described in detail with reference to the accompanying drawings.

(Embodiment)

Figure 1:
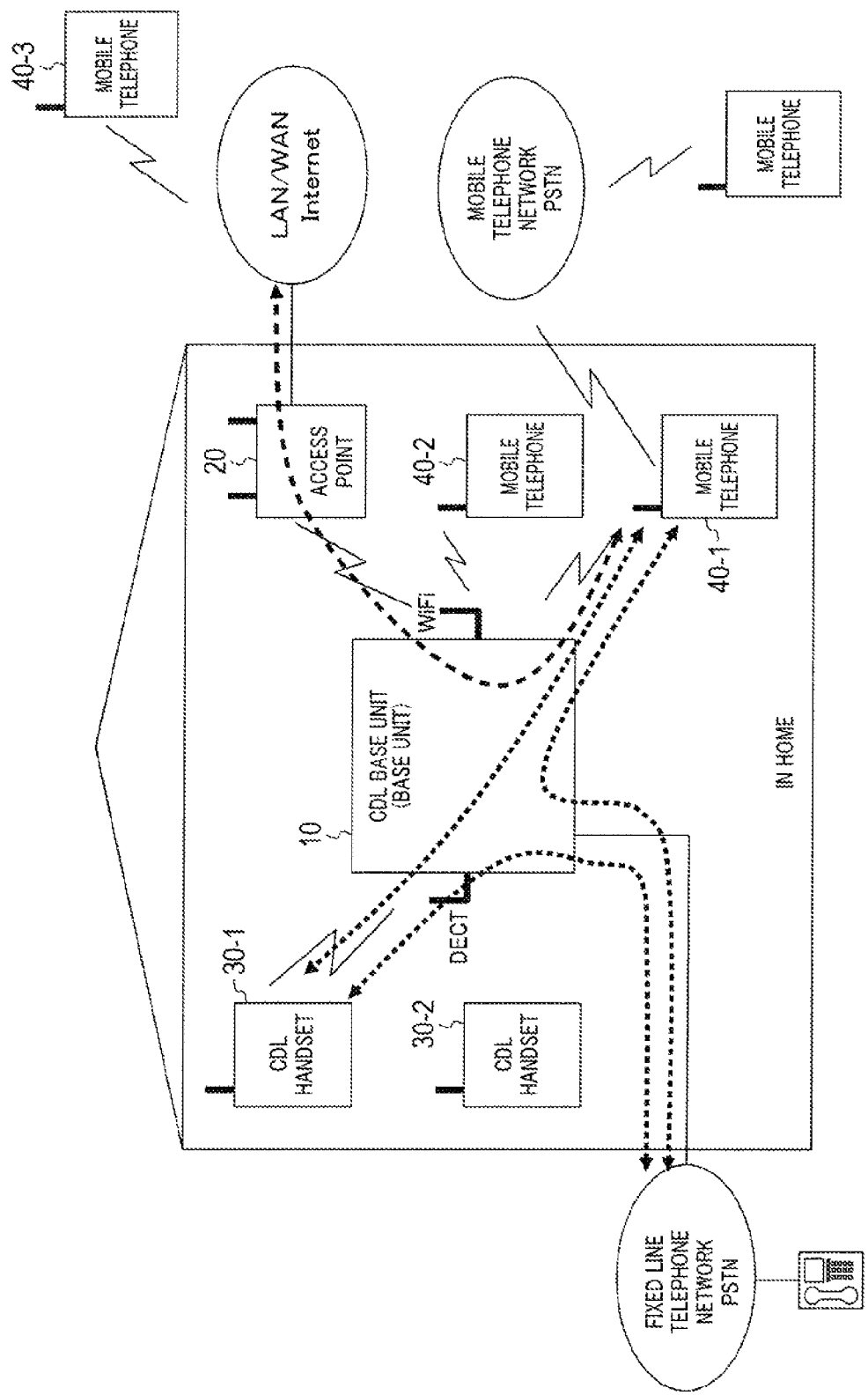
FIG. 1 is a schematic diagram illustrating a configuration of a cordless telephone system according to an embodiment of the present invention.

FIG. 1 is a schematic diagram illustrating the configuration of a cordless telephone system according to an embodiment of the present invention. Hereunder, the configuration of the cordless telephone system will be described using FIG. 1. Note that, although mobile telephones including smartphones are described as an example of a wireless IP-terminal, the present invention is not limited to this case.

In FIG. 1, base unit 10 is provided in a home and connected to the Internet through access point 20 and is also connected to a fixed line telephone network. It is assumed that there are also cordless handsets (CDL handsets) 30-1 and 30-2 that connect with base unit 10, and mobile telephones 40-1 and 40-2 that connect with base unit 10, a mobile telephone network and a wireless LAN in the home. Furthermore, it is assumed that mobile telephone 40-3 that has similar functions to mobile telephones 40-1 and 40-2 exists outside the home. Note that, the cordless handsets are collectively referred to as "cordless handset 30" unless a specific cordless handset is distinguished, and the mobile telephones are collectively referred to as "mobile telephone 40" unless a specific mobile telephone is distinguished. It is assumed that mobile telephone 40 is connected to base unit 10 via a wireless LAN.

In FIG. 1, cordless handset 30 can connect with the fixed line telephone network and the mobile telephones through base unit 10. Further, mobile telephone 40 can connect with cordless handset 30, the fixed line telephone network, and access point 20 through base unit 10.

In FIG. 1, cordless handset 30 adopts a DECT (Digital Enhanced Cordless Telecommunications) system for the wireless communication system between the handsets and the base unit, and cordless handset 30 can connect with the fixed line telephone network and the mobile telephones through base unit 10. Mobile telephone 40 can connect with cordless handset 30, the fixed line telephone network, and access point 20 (the Internet) through base unit 10.

Figure 2:
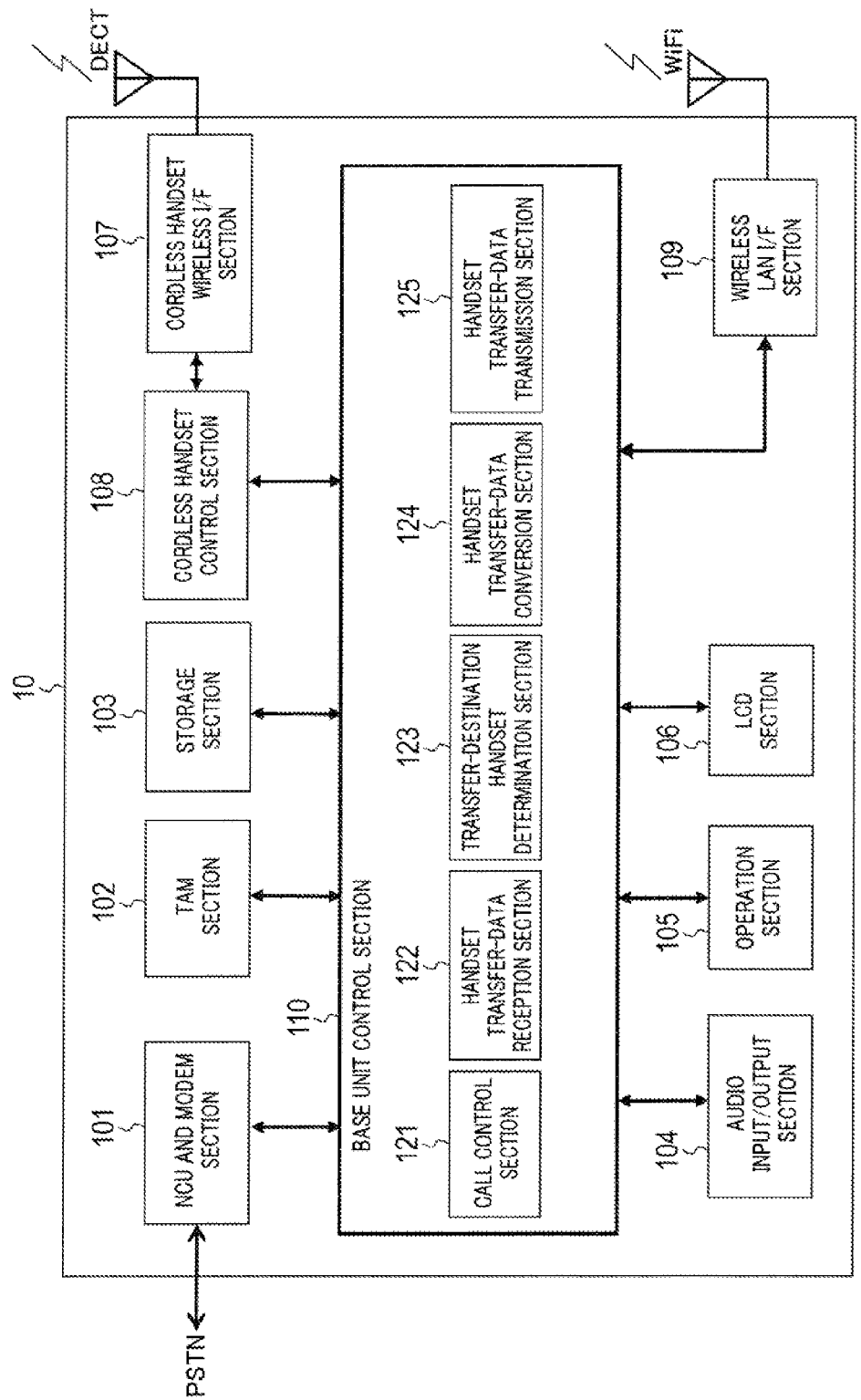
FIG. 2 is a block diagram illustrating a configuration of a base unit shown in FIG. 1.

FIG. 2 is a block diagram illustrating the configuration of base unit 10 shown in FIG. 1. Hereunder, the configuration of base unit 10 will be described using FIG. 2.

NCU (network control unit) and modem section 101 includes a network control unit (NCU) that performs control on a telephone line, including connection with a public network when making an outgoing call, detection of an incoming call from a public network, and the like, and a modem unit that receives caller number information from the public network at the time of an incoming call.

TAM (Telephone Answering Machine) section 102 stores an answering machine message, and records and reproduces a voice message.

Storage section 103 stores various kinds of setting data of the cordless telephone equipment, telephone directory data, outgoing and incoming call history information, and handset additional information including a communication history of the handsets such as SMS (Short Message Service) messages. In the cordless telephone equipment, there are cases in which telephone directory data is set for each cordless handset 30, and there are cases in which telephone directory data is set and shared by all cordless handsets 30. Base unit 10 stores and manages at least one of the telephone directory data set for each cordless handset 30 and telephone directory data shared by all cordless handsets 30.

Further, storage section 103 stores a handset information table shown in FIG. 3. In the handset information table, an ID (a handset A to a handset F) of each cordless handset 30, a connection state (a connected/disconnected state) of each cordless handset 30, a handset number (handset extension number), an image size, a use CODEC, and the like are associated with each other. Further, base unit 10 may acquire handset type information including an image size and a use CODEC at the time of connection with each cordless handset 30, and may uniquely use an image size and a use CODEC used by a handset which is fixed to a system.

Audio input/output section 104 includes a microphone, a speaker, and a CODEC, and outputs a ringtone and also receives and outputs telephone call speech.

Operation section 105 includes dial keys and various function keys with which a user performs operations. LCD (liquid crystal display) section 106 displays various kinds of information.

Cordless handset wireless I/F section 107 is a circuit that transmits and receives radio data to and from cordless handset 30, and includes an RF/IF (Radio Frequency/Intermediate Frequency) section that performs frequency conversion of radio signals, a modulation/demodulation section that performs modulation and demodulation, and a digital signal processing circuit that performs TDMA signal processing and the like.

Cordless handset control section 108 transmits and receives control data to and from cordless handsets 30, and performs protocol control for outgoing calls and incoming calls and the like in accordance with a control protocol (for example, a DECT protocol system, a PHS protocol system, or the like) between base unit 10 and cordless handset 30. Note that, in the following description, it is assumed that the DECT system is adopted as the control protocol with respect to cordless handset 30.

Wireless LAN I/F section 109 performs wireless LAN protocol control in accordance with a protocol such as IEEE 802.11 or Bluetooth (registered trademark) to transmit and receive radio data to and from mobile telephone 40.

Base unit control section 110 performs overall control of base unit 10. Specifically, base unit control section 110 receives and analyzes events and messages that originate from each section around base unit control section 110, controls the state of outgoing and incoming calls and the call connection, and issues instructions for call connections to each section. Base unit control section 110 includes call control section 121, handset transfer-data reception section 122, transfer-destination handset determination section 123, handset-transfer-data conversion section 124, and handset transfer-data transmission section 125.

Call control section 121 processes events and various messages received from NCU and modem section 101 and cordless handset control section 108.

Handset transfer-data reception section 122 receives handset transfer-data from mobile telephone 40 via wireless LAN I/F section 109, and stores handset transfer-data in storage section 103.

Transfer-destination handset determination section 123 extracts transfer-destination handset information from handset transfer-data stored in storage section 103, and selects cordless handset 30 that is a transfer-destination of the handset transfer-data based on a transfer-destination handset number set to the transfer-destination handset information.

Handset transfer-data conversion section 124 executes a predetermined conversion process according to a type of handset transfer-data stored in storage section 103. Specifically, when handset transfer-data is ringtone data, handset transfer-data conversion section 124 converts the audio format of the ringtone data according to the use CODEC of cordless handset 30. Further, when handset transfer-data is wallpaper data, handset transfer-data conversion section 124 converts the image size of the wallpaper data into a size reproducible in cordless handset 30. Further, when handset transfer-data is telephone directory data, handset transfer-data conversion section 124 converts an image size of image data of the other party included in the telephone directory data into a size reproducible in cordless handset 30.

Handset transfer-data transmission section 125 transmits, via cordless handset wireless I/F section 107, handset transfer-data that has been subjected to the conversion process by handset transfer-data conversion section 124 to cordless handset 30 selected by transfer-destination handset determination section 123. Further, handset transfer-data transmission section 125 sends mobile telephone 40 a signal representing that the conversion process has not been executed, or a signal representing that the conversion process has been executed.

Figure 4:
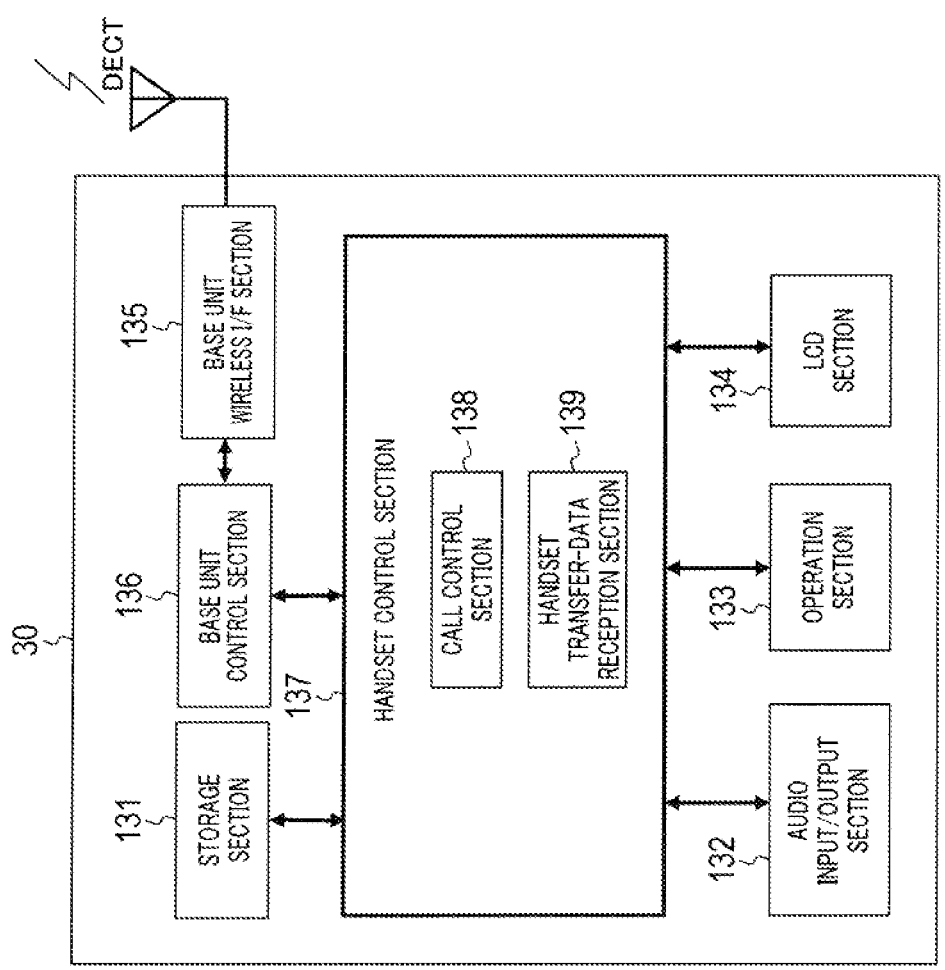
FIG. 4 is a block diagram illustrating a configuration of a cordless handset shown in FIG. 1.

FIG. 4 is a block diagram illustrating a configuration of cordless handset 30 shown in FIG. 1. The configuration of cordless handset 30 will be described below with reference to FIG. 4.

Storage section 131 stores various kinds of data used by cordless handset 30 such as ringtone data, wallpaper data, and telephone directory data in a predetermined storage area.

Audio input/output section 132 includes a microphone, a speaker, and a CODEC, and outputs a ringtone and also receives and outputs telephone call speech.

Operation section 133 includes dial keys and various function buttons provided for a user to perform operations. LCD (liquid crystal display) section 134 displays various kinds of information.

Base unit wireless I/F section 135 is a circuit that transmits and receives radio data to and from base unit 10, and includes an RF/IF section that performs frequency conversion of a radio signal, a modulation/demodulation section that performs modulation and demodulation, and a digital signal processing circuit that performs TDMA signal processing and the like.

Base unit control section 136 transmits and receives control data to and from base unit 10, and performs protocol control for outgoing calls and incoming calls and the like in accordance with a control protocol (for example, a DECT protocol, a PHS protocol or the like) between base unit 10 and cordless handset 30.

Handset control section 137 performs overall control of cordless handset 30. Specifically, handset control section 137 receives and analyzes events and messages that originate from each section around handset control section 137, controls the state of outgoing and incoming calls and the call connection, and issues instructions for call connection to each section. Handset control section 137 includes call control section 138 and handset transfer-data reception section 139.

Call control section 138 processes events and various messages received from base unit control section 136.

Handset transfer-data reception section 139 receives handset transfer-data from base unit 10 via base unit wireless I/F section 135, and stores the handset transfer-data in the storage area of storage section 131 according to the type of handset transfer-data.

Figure 5:
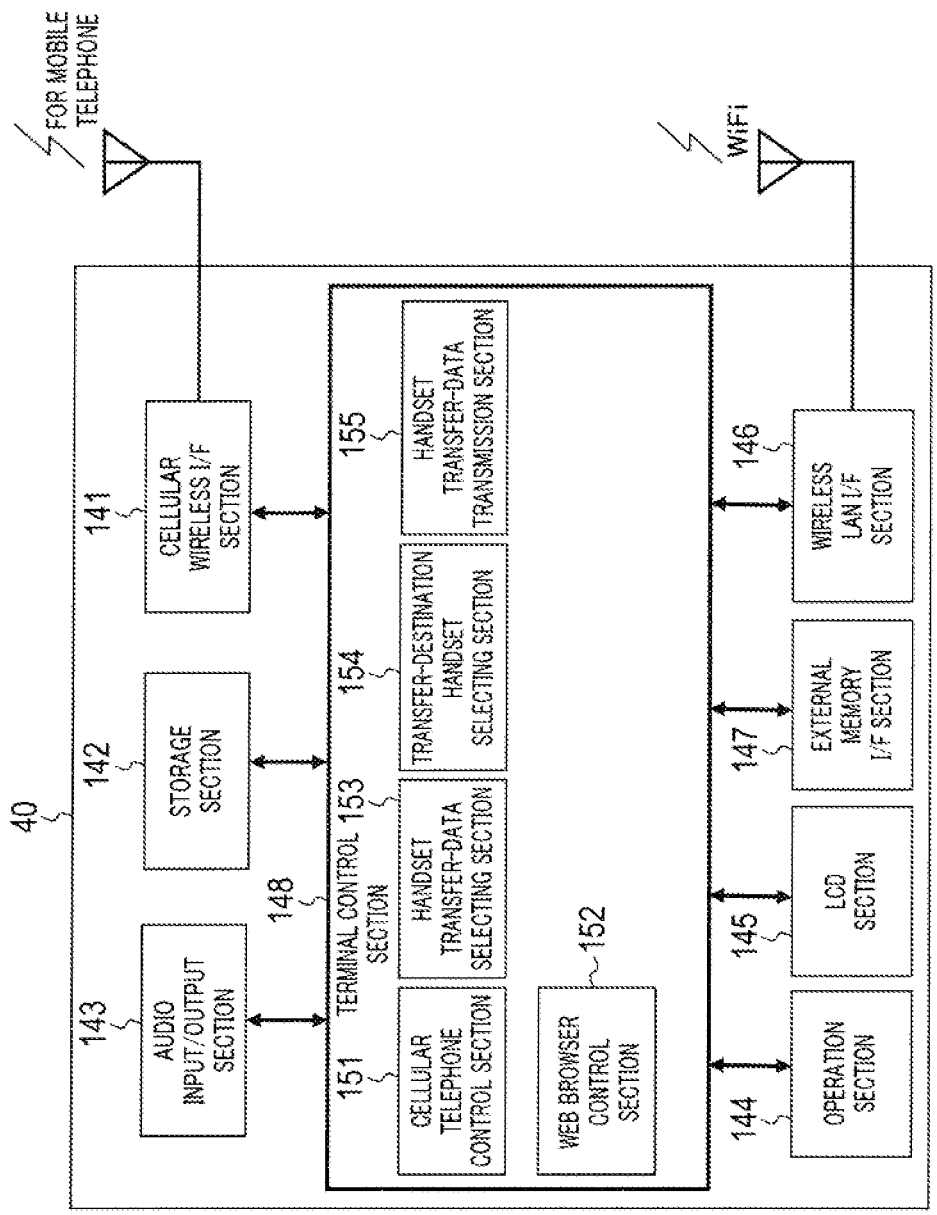
FIG. 5 is a block diagram illustrating a configuration of a mobile telephone (wireless IP-terminal) shown in FIG. 1.

FIG. 5 is a block diagram illustrating the configuration of mobile telephone 40 shown in FIG. 1. Hereunder, the configuration of mobile telephone 40 will be described using FIG. 5.

Cellular wireless I/F section 141 transmits and receives radio data to and from a mobile telephone base station through a mobile telephone antenna.

Storage section 142 stores information such as various kinds of setting data of mobile telephone 40, telephone directory data, outgoing and incoming call history information, SMS messages, various kinds of image data (including wallpaper data), and music data (including ringtone data), for example.

Audio input/output section 143 includes a microphone and a speaker, and outputs a ringtone and also receives and outputs telephone call speech.

Operation section 144 includes dial keys and various function keys with which a user performs operations. LCD section 145 displays various kinds of information. Operation section 144 and LCD section 145 may also be included in a touch panel of a smartphone or the like.

Wireless LAN I/F section 146 performs wireless LAN protocol control in accordance with a protocol such as IEEE 802.11 or Bluetooth (registered trademark) to transmit and receive radio data to and from base unit 10.

External memory I/F section 147 includes an external memory such as an SD card in a removable form and performs data reading/writing with the attached external memory.

Terminal control section 148 performs overall control of mobile telephone 40. Specifically, terminal control section 148 receives and analyzes events and messages that originate from each section around terminal control section 148, controls the state of outgoing and incoming calls and the call connection, and issues instructions to each section. Terminal control section 148 includes cellular telephone control section 151, web browser control section 152, handset transfer-data selecting section 153, transfer-destination handset selecting section 154, and handset transfer-data transmission section 155.

Cellular telephone control section 151 processes call control messages received from cellular wireless I/F section 141.

Web browser control section 152 performs control such that an HTML file, an image file, a music file, or the like is downloaded from the Internet via cellular wireless I/F section 141 or wireless LAN I/F section 146, and a web screen layout is analyzed, and a display or reproduction operation is performed.

Handset transfer-data selecting section 153 selects data to be transferred to cordless handset 30 from a data group stored in storage section 142 based on the user operation received from operation section 144 (including LCD section 145), and outputs the selected data to handset transfer-data transmission section 155.

Transfer-destination handset selecting section 154 selects cordless handset 30 of the data transfer-destination based on the user operation received from operation section 144 (including LCD section 145), and outputs the result of selection to handset transfer-data transmission section 155. Further, transfer-destination handset selecting section 154 can select one or more cordless handsets 30.

Handset transfer-data transmission section 155 edits data (handset transfer-data) output from transfer-destination handset selecting section 154. Specifically, handset transfer-data transmission section 155 generates a header portion of the handset transfer-data, and sets a transfer-destination handset number indicating cordless handset 30 selected by handset transfer-data selecting section 153 to transfer-destination handset information of a handset transfer-data message of the header portion. Then, handset transfer-data transmission section 155 transmits the edited handset transfer-data to base unit 10 via wireless LAN I/F section 146.

Next, the process of storing various kinds of data (telephone directory data, wallpaper data, and ringtone data) held in mobile telephone 40 in cordless handset 30 in a state usable in cordless handset 30 will be described with reference to FIGS. 6 to 8.

Figure 6:
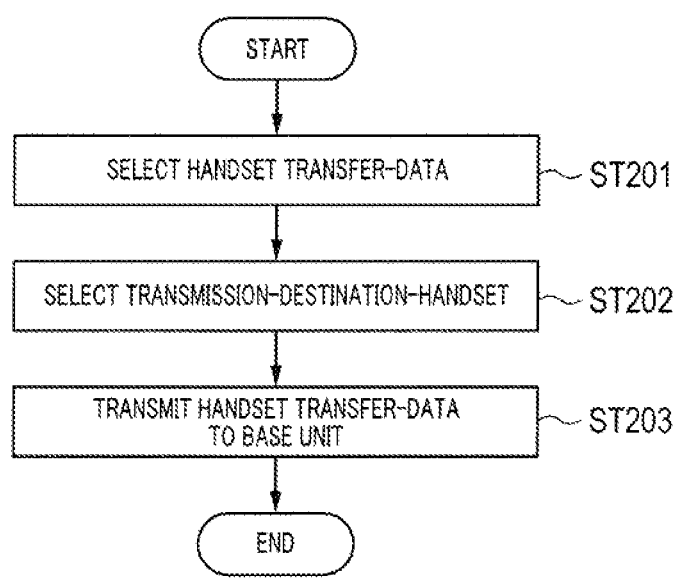
FIG. 6 is a flowchart illustrating a processing procedure of the mobile telephone shown in FIG. 5.

FIG. 6 is a flowchart illustrating a processing procedure of mobile telephone 40. First, in ST201, handset transfer-data selecting section 153 selects data (handset transfer-data) to be transferred to cordless handset 30 from among various kinds of data groups (telephone directory data, wallpaper data, ringtone data, and the like) stored in storage section 142 based on the user operation received from operation section 144 (including LCD section 145).

Then, in ST202, transfer-destination handset selecting section 154 selects cordless handset 30 that is the data transfer-destination based on the user operation received from operation section 144 (including LCD section 145). Further, transfer-destination handset selecting section 154 can select a plurality of cordless handsets 30.

Then, in ST203, handset transfer-data transmission section 155 edits the handset transfer-data output from transfer-destination handset selecting section 154, and transmits the edited handset transfer-data to base unit 10 via wireless LAN I/F section 146. In the editing, handset transfer-data transmission section 155 sets a transfer-data type (telephone directory data, wallpaper data, or ringtone data) and a transfer-destination handset number indicating cordless handset 30 selected by handset transfer-data selecting section 153 to the header portion of the handset transfer-data, and edits a transfer-data body portion (a ringtone data portion, an image data portion, or a telephone directory data portion).

Figure 7:
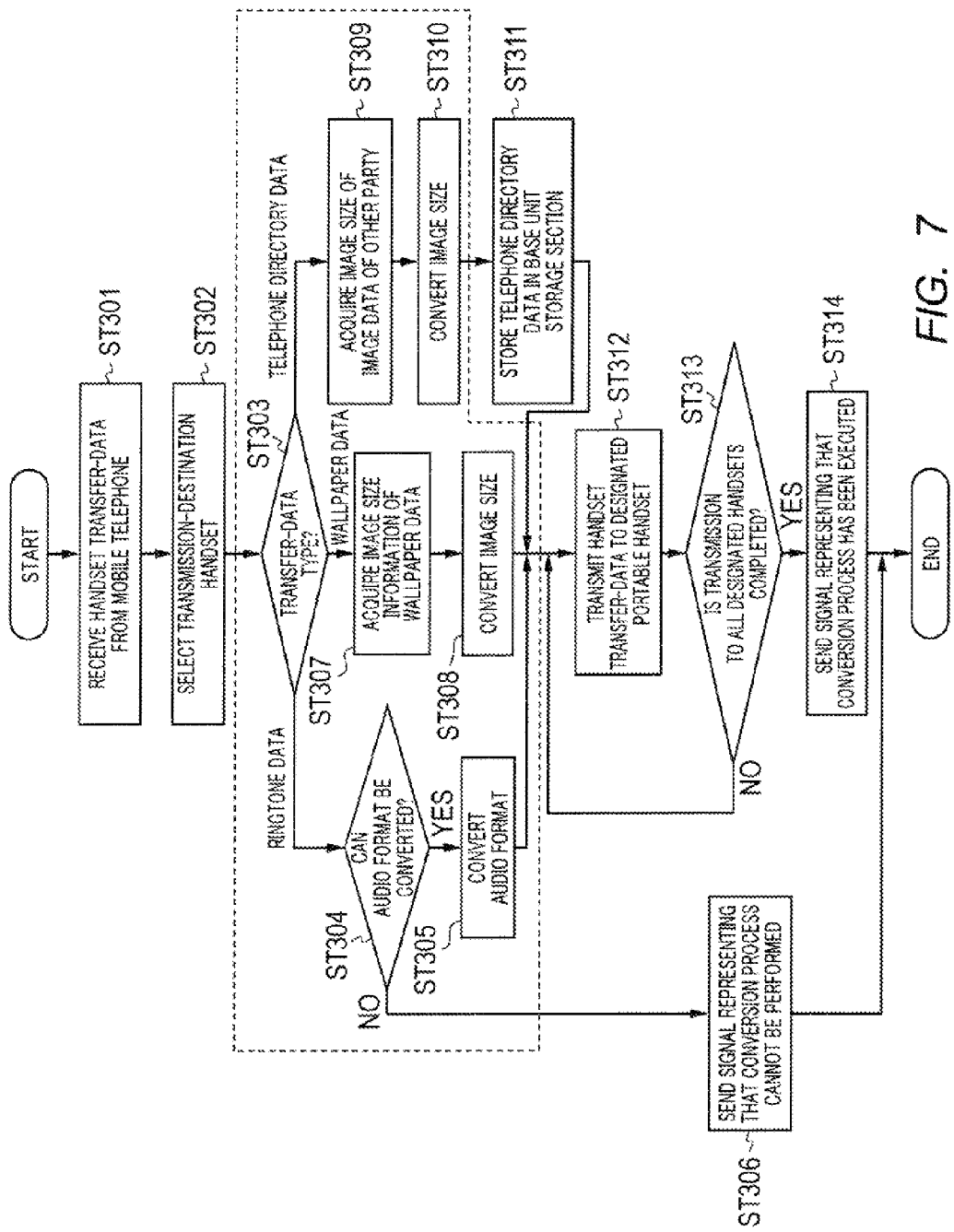
FIG. 7 is a flowchart illustrating a processing procedure of the base unit shown in FIG. 2.

FIG. 7 is a flowchart illustrating a processing procedure of base unit 10. First, in ST301, handset transfer-data reception section 122 receives the handset transfer-data from mobile telephone 40) via wireless LAN I/F section 109, and stores the handset transfer-data in storage section 103.

Then, in ST302, transfer-destination handset determination section 123 extracts transfer-destination handset information from the handset transfer-data stored in storage section 103, and selects cordless handset 30 that is the transfer-destination of the handset transfer-data based on the transfer-destination handset number set to the transfer-destination handset information.

Then, in ST303 to ST310, handset transfer-data conversion section 124 executes a predetermined conversion process according to the type of handset transfer-data.

Specifically, first, in ST303, handset transfer-data conversion section 124 determines the type of handset transfer-data stored in storage section 103.

Then, when the handset transfer-data is ringtone data ("ringtone data" in ST303), in ST304, handset transfer-data conversion section 124 determines whether or not the handset transfer-data is ringtone data whose format can be converted in cordless handset 30. For example, handset transfer-data conversion section 124 determines that the handset transfer-data is ringtone data whose format can be converted, when the audio format of the ringtone data portion of the handset transfer-data is an MP3 (MPEG Audio Layer-3) format or a WAV format, and determines that the handset transfer-data is not ringtone data whose format can be converted, when the audio format of the ringtone data portion of the handset transfer-data is any other audio format.

When the handset transfer-data is determined to be ringtone data whose format can be converted (YES in ST304), in ST305, handset transfer-data conversion section 124 converts the audio format of the handset transfer-data (ringtone data) according to the use CODEC of cordless handset 30. For example, format conversion from MP3 is performed so that the ringtone data can be reproduced according to G.722. Thereafter, the flow proceeds to ST312.

Meanwhile, when the handset transfer-data is determined to be not ringtone data whose format cannot be converted (NO in ST304), in ST306, handset transfer-data transmission section 125 sends mobile telephone 40 a signal representing that the conversion process cannot be performed, and then ends the process.

Further, when the handset transfer-data is wallpaper data ("wallpaper data" in ST303), in ST307, handset transfer-data conversion section 124 acquires image size information from the image data header portion (for example, the JPEG header portion) of the handset transfer-data. Further, in ST308, handset transfer-data conversion section 124 converts the image size of the handset transfer-data (wallpaper data) into a size reproducible in cordless handset 30. For example, when size information of the image data transmitted from mobile telephone 40 is an XGA (1024×768 pixels) size, and a size that can be displayed by handset 30 is a QVGA (320×240 pixels) size, an image size conversion process from the XGA to the QVGA size is performed. Thereafter, the flow proceeds to ST312.

Further, when the handset transfer-data is telephone directory data ("telephone directory data" in ST303), in ST309, handset transfer-data conversion section 124 acquires image size information of the image data of the other party from the header portion of the handset transfer-data. Then, in ST310, handset transfer-data conversion section 124 converts the image size of the image data of the other party of the handset transfer-data into a size reproducible in cordless handset 30, similarly to the wallpaper data.

Then, in ST311, handset transfer-data transmission section 125 stores the handset transfer-data (telephone directory data) that has been subjected to the conversion process by handset transfer-data conversion section 124 in storage section 103. Thereafter, the flow proceeds to ST312.

After the process of ST305, ST308, or ST311, in ST312, handset transfer-data transmission section 125 transmits the handset transfer-data that has been subjected to the conversion process by handset transfer-data conversion section 124 to cordless handset 30 selected by transfer-destination handset determination section 123 via cordless handset wireless I/F section 107. Further, when a plurality of cordless handsets 30 are selected, the process of ST312 is repeatedly performed on all selected cordless handsets 30 (NO in ST313).

After the processes of ST312 and ST313 are completed (YES in ST313), in ST314, handset transfer-data transmission section 125 sends mobile telephone 40 a signal indicating that the conversion process has been performed, and ends the process.

Figure 8:
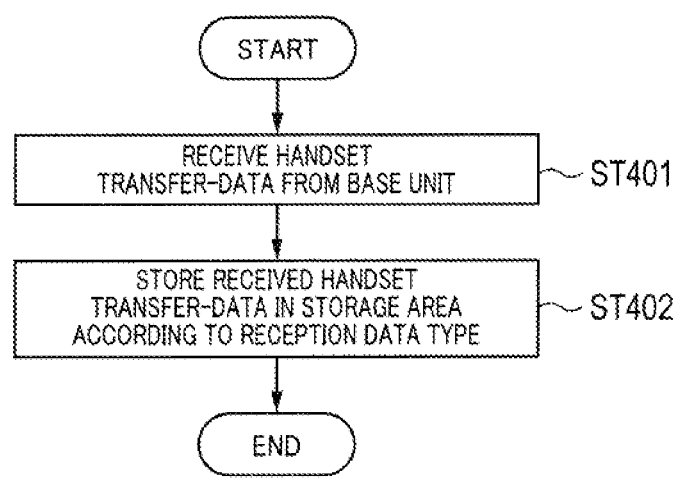
FIG. 8 is a flowchart illustrating a processing procedure of the cordless handset shown in FIG. 4.

FIG. 8 is a flowchart illustrating a process of cordless handset 30. First, in ST401, the handset transfer-data reception section 139 receives the handset transfer-data from base unit 10 via base unit wireless I/F section 135.

Then, in ST402, the handset transfer-data reception section 139 stores the handset transfer-data in the storage area of storage section 131 according to the type of handset transfer-data.

The above description has been made using an example in which the conversion process has been performed on the handset transfer-data in base unit 10, but the present invention is not limited to this example, and the conversion process may be performed on the handset transfer-data in mobile telephone 40. Further, the above description has been made using an example in which the selection and conversion processes are performed on the ringtone data, but the same process as in the case of ringtone data can be performed even on holding tone data used in cordless handset 30 or sound source data such as a guidance message of the answering machine in the present invention.

Figure 9:
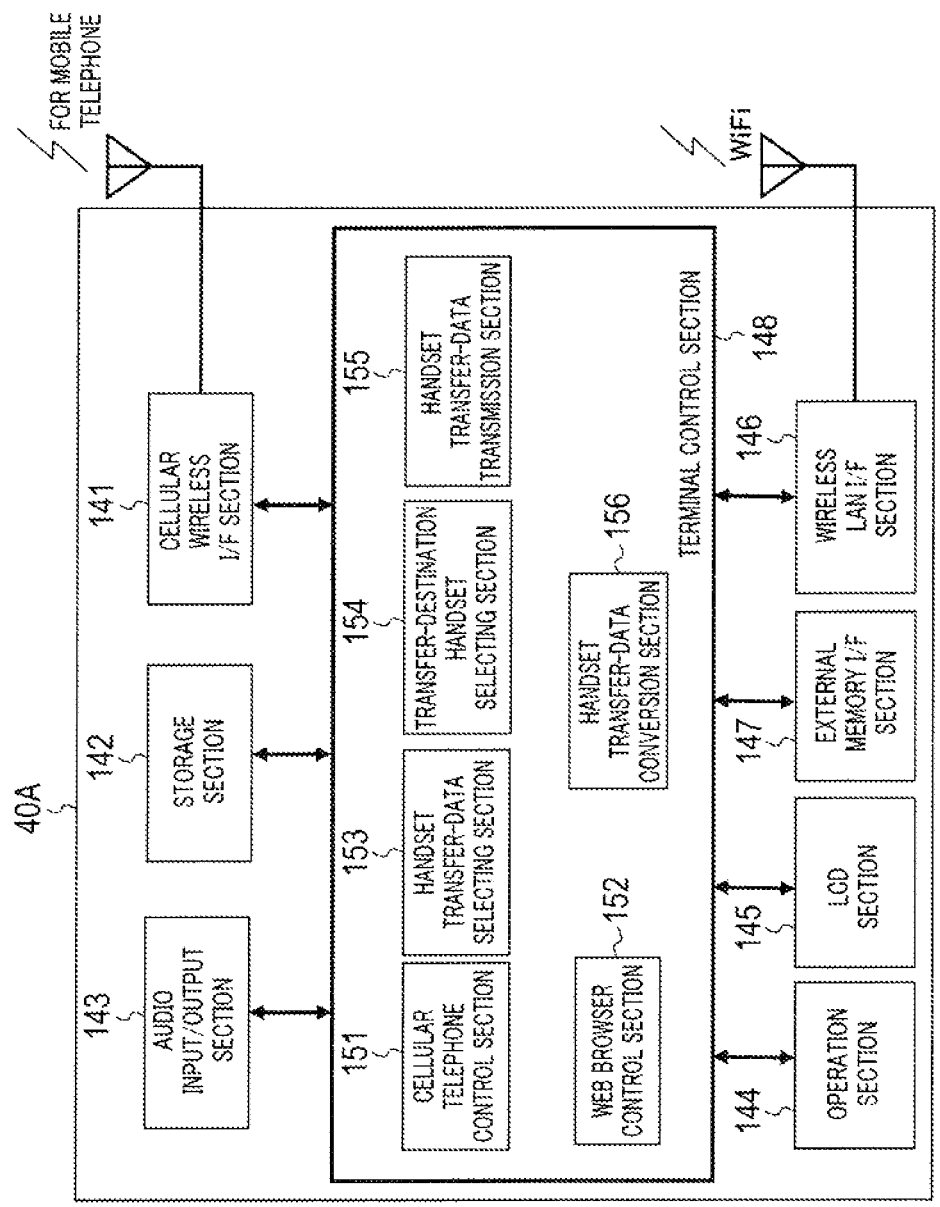
FIG. 9 is a block diagram illustrating another configuration of a mobile telephone.

FIG. 9 is a block diagram illustrating a configuration of mobile telephone 40A in this case. Mobile telephone 40A shown in FIG. 9 employs a configuration in which handset transfer-data conversion section 156 is added to mobile telephone 40 shown in FIG. 5. In this case, handset transfer-data conversion section 124 is deleted from the configuration of base unit 10 shown in FIG. 2.

The handset transfer-data conversion section 156 performs a predetermined conversion process according to the type of handset transfer-data stored in storage section 142. Specifically, when the handset transfer-data is ringtone data, handset transfer-data conversion section 156 converts the audio format of the ringtone data according to the use CODEC of cordless handset 30. Further, when the handset transfer-data is wallpaper data, handset transfer-data conversion section 156 converts the image size of the wallpaper data into a size reproducible in cordless handset 30. Further, when the handset transfer-data is telephone directory data, handset transfer-data conversion section 156 converts the image size of the image data of the other party of the handset transfer-data into a size reproducible in cordless handset 30.

Figure 10:
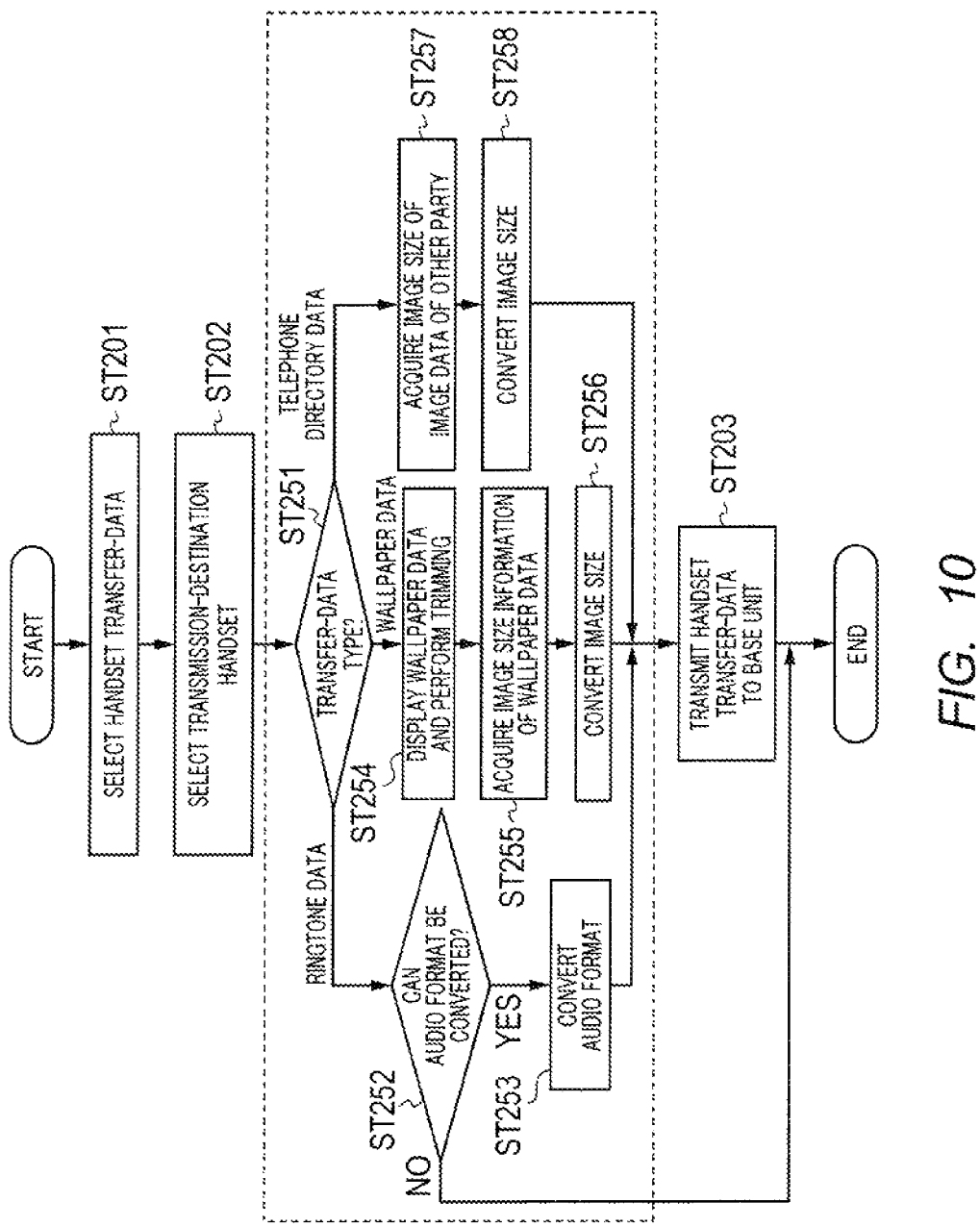
FIG. 10 is a flowchart illustrating a processing procedure of the mobile telephone shown in FIG. 9.

FIG. 10 is a flowchart illustrating a processing procedure of mobile telephone 40A. The flowchart of FIG. 10 is one in which ST251 to ST259 are added between ST202 and ST203 in the flowchart of FIG. 6. In this case, ST303 to ST310 are deleted from the processing process of base unit 10 shown in FIG. 7.

After ST202, in ST251 to ST258, handset transfer-data conversion section 156 performs a predetermined conversion process according to the type of handset transfer-data.

Specifically, in ST251, handset transfer-data conversion section 156 determines the type of handset transfer-data stored in storage section 142.

Then, when the handset transfer-data is ringtone data ("ringtone data" in ST251), in ST252, handset transfer-data conversion section 156 determines whether or not the handset transfer-data is ringtone data whose format is can be converted in cordless handset 30.

When the handset transfer-data is determined to be ringtone data whose format can be converted (YES in ST252), in ST253, handset transfer-data conversion section 156 converts the audio format of the handset transfer-data (ringtone data) according to the use CODEC of the cordless handset 30.

Thereafter, the flow proceeds to ST203. However, when the handset transfer-data is determined to be ringtone data whose format cannot be converted (NO in ST252), handset transfer-data conversion section 156 ends the process.

Further, when the handset transfer-data is wallpaper data ("wallpaper data" in ST251), in ST254, handset transfer-data conversion section 156 displays the wallpaper data, and performs a trimming process or the like as necessary. Then, in ST255, handset transfer-data conversion section 156 acquires the image size information from the header portion of the handset transfer-data. Then, in ST256, handset transfer-data conversion section 156 converts the image size of the handset transfer-data (wallpaper data) into a size reproducible in cordless handset 30. Thereafter, the flow proceeds to ST203.

Further, when the handset transfer-data is telephone directory data ("telephone directory data" in ST251), in ST257, handset transfer-data conversion section 156 acquires the image size information of the image data of the other party from the header portion of the handset transfer-data. Then, in ST258, handset transfer-data conversion section 156 converts the image size of the image data of the other party of the handset transfer-data into a size reproducible in cordless handset 30. Thereafter, the flow proceeds to ST203.

As described above, in the present embodiment, in base unit 10 or mobile telephone 40, a predetermined conversion process is performed on various kinds of data. As a result, it is possible to store various kinds of data (the handset transfer-data) stored in mobile telephone 40 in cordless handset 30 in a state usable in cordless handset 30 without provision of a new apparatus to cordless handset 30.

The above description has been made in connection with the example in which only any one of base unit 10 and mobile telephone 40 performs the conversion process on the handset transfer-data, but the present invention is not limited to this example, and the conversion process function can be distributed such that the conversion process for some types of handset transfer-data is performed in base unit 10, and the conversion process for the other types of handset transfer-data is performed in mobile telephone 40. For example, the conversion process for the ringtone data that is small in data volume and requires a small processing load may be performed in base unit 10, and the conversion process for the image data that is large in data volume and requires a large processing load may be performed in mobile telephone 40.

Further, when ringtone data is included in the handset transfer-data, cordless handset 30 can reproduce the ringtone data without change using the use CODEC. Further, when wallpaper data is included in the handset transfer-data, cordless handset 30 can display the wallpaper data on an LCD section without change. Further, when telephone directory data is included in the handset transfer-data, cordless handset 30 can display the image data of the other party corresponding to the telephone number information included in the telephone directory data to on an LCD section without change. Further, base unit 10 can store the telephone directory data in the storage section so that the telephone directory data can be used as the telephone directory managed by base unit 10.

The cordless telephone equipment and cordless telephone system according to the present invention are useful for storing, various kinds of data stored in a mobile telephone, in a cordless handset in a state usable in the cordless handset without provision of a new apparatus to the cordless handset.

INCORPORATION BY REFERENCE

The present application claims priority from Japanese Patent Application No. 2013-158992 filed on Jul. 31, 2013, the content of which is hereby incorporated by reference into this application.

The invention claimed is:

1. Cordless telephone equipment comprising:
at least one handset; and
a base unit of the handset, wherein
the base unit is connected to a wireless IP-terminal via a wireless LAN, the wireless IP-terminal instructing the base unit to transfer handset transfer-data including image data or music data to the handset, wherein
the base station comprises:
a wireless LAN interface that transmits and receives packet data to and from the wireless IP terminal;
a handset transfer-data receiver that receives handset transfer-data including transfer-destination handset information from the wireless IP-terminal via the wireless LAN interface and that stores the handset transfer-data in a storage, the transfer-destination handset information indicating a transfer-destination handset number;
a transfer-destination handset determiner that determines a transfer-destination handset of the handset transfer-data based on the transfer -destination handset information of the handset transfer-data stored in the storage;
a handset transfer-data converter that converts the handset transfer-data into a data format usable in the transfer-destination handset according to a data type of the handset transfer-data; and
a handset transfer-data transmitter that transmits the handset transfer-data that has been subjected to the conversion, to all transfer-destination handsets extracted by the transfer-destination handset determiner; wherein when the handset transfer-data includes wallpaper data, the handset transfer-data converter resizes the wallpaper data into an image size of a wallpaper to be displayed on the transfer-destination handset.

2. Cordless telephone equipment comprising:

at least one handset; and a base station of the handset, wherein the base station is connected to a wireless IP-terminal via a wireless LAN, the wireless IP-terminal instructing the base station to transfer handset transfer-data including image data or music data to the handset, wherein the base station comprises:
- a wireless LAN interface that transmits and receives packet data to and from the wireless IP terminal;
- a handset transfer-data receiver that receives handset transfer-data including transfer-destination handset information from the wireless IP-terminal via the wireless LAN interface and that stores the handset transfer-data in a storage, the transfer-destination handset information indicating a transfer-destination handset number;
- a transfer-destination handset determiner that determines a transfer-destination handset of the handset transfer-data based on the transfer-destination handset information of the handset transfer-data stored in the storage;
- a handset transfer-data converter that converts the handset transfer-data into a data format usable in the transfer-destination handset according to a data type of the handset transfer-data; and
- a handset transfer-data transmitter that transmits the handset transfer-data that has been subjected to the conversion, to all transfer-destination handsets extracted by the transfer-destination handset determiner;

wherein, when the handset transfer-data includes telephone directory data, the handset transfer-data converter resizes a thumbnail image data portion of the telephone directory data into an image size of a thumbnail usable in the transfer-destination handset.

3. A cordless telephone system comprising:

cordless telephone equipment including at least one handset, a base station of the handset; and a wireless IP-terminal that is connected to the base station via a wireless LAN, wherein the wireless IP-terminal comprises:
- a first wireless LAN interface that transmits and receives packet data to and from the base station;
- a handset transfer-data selector that selects handset transfer-data to be transferred to the handset, from among image data and music data stored in a first storage;
- a transfer-destination handset selector that selects at least one handset as a transfer-destination of the handset transfer-data; and
- a handset data transmitter that instructs the base station to transfer handset transfer-data to a handset, by editing the handset transfer-data in such a way that the handset transfer-data includes transfer-destination handset information indicating a number of the handset selected by the transfer-destination handset selector, and transmitting the edited transfer-destination handset information to the base station, the base station comprises:
- a second wireless LAN interface that transmits and receives packet data to and from an external wireless IP-terminal;
- a handset transfer-data receiver that receives the handset transfer-data from the wireless IP-terminal via the second wireless LAN interface and that stores the handset transfer-data in a second storage;
- a transfer-destination handset determiner that determines a transfer-destination handset of the handset transfer-data based on the transfer-destination handset information of the handset transfer-data stored in the second storage;
- a handset transfer-data converter that converts the handset transfer-data into a data format usable in the transfer-destination handset according to a data type of the handset transfer-data; and
- a handset transfer-data transmitter that transmits the handset transfer-data that has been converted by the handset transfer-data converter to all transfer-destination handsets extracted by the transfer-destination handset determiner; wherein when the handset transfer-data includes wallpaper data, the handset transfer-data converter resizes the wallpaper data into an image size of a wallpaper to be displayed on the transfer-destination handset.

4. A cordless telephone system comprising:

cordless telephone equipment including at least one handset, a base station of the handset; and a wireless IP-terminal that is connected to the base station of the cordless telephone equipment via a wireless LAN, wherein the wireless IP-terminal comprises:
- a first wireless LAN interface that transmits and receives packet data to and from the base station;
- a handset transfer-data selector that selects handset transfer-data to be transferred to the handset, from among data stored in a first storage;
- a transfer-destination handset selector that selects at least one handset as a transfer-destination of the handset transfer-data;
- a handset transfer-data converter that converts the handset transfer-data into a state usable in the transfer-destination handset; and
- a handset data transmitter that edits the handset transfer-data that has been converted by the handset transfer-data converter in such a way that the handset transfer-data includes transfer-destination handset information indicating a number of the handset selected by the transfer-destination handset selector, and that transmits the edited handset transfer-data to the base station, and the base station comprises:
- a second wireless LAN interface that transmits and receives packet data to and from an external wireless IP-terminal;
- a handset transfer-data receiver that receives the handset transfer-data from the wireless IP-terminal via the second wireless LAN interface and that stores the handset transfer-data in a second storage;
- a transfer-destination handset determiner that determines a transfer-destination handset of the handset transfer-data based on the transfer-destination handset information of the handset transfer-data stored in the second storage; and a handset transfer-data transmitter that transmits the handset transfer-data determined by the transfer-destination handset determiner; wherein when the handset transfer-data includes wallpaper data, the handset transfer-data converter resizes the wallpaper data into an image size of a wallpaper to be displayed on the transfer-destination handset.

5. A cordless telephone system comprising:
cordless telephone equipment including at least one handset,
a base station of the handset; and
a wireless IP-terminal that is connected to the base station via a wireless LAN, wherein
the wireless IP-terminal comprises:
 a first wireless LAN interface that transmits and receives packet data to and from the base station;
 a handset transfer-data selector that selects handset transfer-data to be transferred to the handset, from among image data and music data stored in a first storage;
 a transfer-destination handset selector that selects at least one handset as a transfer-destination of the handset transfer-data; and
 a handset data transmitter that instructs the base station to transfer handset transfer-data to a handset, by editing the handset transfer-data in such a way that the handset transfer-data includes transfer-destination handset information indicating a number of the handset selected by the transfer-destination handset selector, and transmitting the edited transfer-destination handset information to the base station,
the base station comprises:
 a second wireless LAN interface that transmits and receives packet data to and from an external wireless IP-terminal;
 a handset transfer-data receiver that receives the handset transfer-data from the wireless IP-terminal via the second wireless LAN interface and that stores the handset transfer-data in a second storage;
 a transfer-destination handset determiner that determines a transfer-destination handset of the handset transfer-data based on the transfer-destination handset information of the handset transfer-data stored in the second storage;
 a handset transfer-data converter that converts the handset transfer-data into a data format usable in the transfer-destination handset according to a data type of the handset transfer-data; and
 a handset transfer-data transmitter that transmits the handset transfer-data that has been converted by the handset transfer-data converter to all transfer-destination handsets extracted by the transfer-destination handset determiner;
wherein, when the handset transfer-data includes telephone directory data, the handset transfer-data converter resizes a thumbnail image data portion of the telephone directory data into an image size of a thumbnail usable in the transfer-destination handset.

6. A cordless telephone system comprising:
cordless telephone equipment including at least one handset,
a base station of the handset; and
a wireless IP-terminal that is connected to the base station via a wireless LAN, wherein
the wireless IP-terminal comprises:
 a first wireless LAN interface that transmits and receives packet data to and from the base station;
 a handset transfer-data selector that selects handset transfer-data to be transferred to the handset, from among image data and music data stored in a first storage;
 a transfer-destination handset selector that selects at least one handset as a transfer-destination of the handset transfer-data; and
 a handset data transmitter that instructs the base station to transfer handset transfer-data to a handset, by editing the handset transfer-data in such a way that the handset transfer-data includes transfer-destination handset information indicating a number of the handset selected by the transfer-destination handset selector, and transmitting the edited transfer-destination handset information to the base station,
the base station comprises:
 a second wireless LAN interface that transmits and receives packet data to and from an external wireless IP-terminal;
 a handset transfer-data receiver that receives the handset transfer-data from the wireless IP-terminal via the second wireless LAN interface and that stores the handset transfer-data in a second storage;
 a transfer-destination handset determiner that determines a transfer-destination handset of the handset transfer-data based on the transfer-destination handset information of the handset transfer-data stored in the second storage;
 a handset transfer-data converter that converts the handset transfer-data into a data format usable in the transfer-destination handset according to a data type of the handset transfer-data; and
 a handset transfer-data transmitter that transmits the handset transfer-data that has been converted by the handset transfer-data converter to all transfer-destination handsets extracted by the transfer-destination handset determiner; wherein
when the handset transfer-data includes telephone directory data, the handset transfer-data receiver stores the telephone directory data in the second storage as telephone directory data of the second storage.

7. A wireless IP-terminal in a cordless telephone system including cordless telephone equipment including at least one handset, and a base station of the handset, the wireless IP-terminal being connected to the base station by radio via a wireless LAN and transmitting handset transfer-data including image data or music data to the handset via the base station, the wireless IP-terminal comprising:
 a wireless LAN interface that transmits and receives packet data to and from the base station;
 a handset transfer-data selector that selects handset transfer-data to be transferred to the handset, from among data stored in a storage;
 a transfer-destination handset selector that selects at least one handset as a transfer-destination of the handset transfer-data;
 a handset transfer-data converter that converts the handset transfer-data into a data format usable in the transfer-destination handset according to a data type of the handset transfer-data selected by the handset transfer-data selector; and
 a handset data transmitter that instructs the base station to transfer the handset transfer-data to the handset, by editing the handset transfer-data that has been converted by the handset transfer-data converter in such a way that the handset transfer-data includes transfer-destination handset information indicating a number of the handset selected by the transfer-destination handset selector; wherein when the handset transfer-data includes wallpaper data, the handset transfer-data converter resizes the wallpaper data into an image size of a wallpaper to be displayed on the transfer-destination handset.

8. A wireless IP-terminal in a cordless telephone system including cordless telephone equipment including at least one handset, and a base station of the handset, the wireless IP-terminal being connected to the base station by radio via a wireless LAN and transmitting handset transfer-data including image data or music data to the handset via the base station, the wireless IP-terminal comprising:

a wireless LAN interface that transmits and receives packet data to and from the base station;

a handset transfer-data selector that selects handset transfer-data to be transferred to the handset, from among data stored in a storage;

a transfer-destination handset selector that selects at least one handset as a transfer-destination of the handset transfer-data;

a handset transfer-data converter that converts the handset transfer-data into a data format usable in the transfer-destination handset according to a data type of the handset transfer-data selected by the handset transfer-data selector; and a handset data transmitter that instructs the base station to transfer the handset transfer-data to the handset, by editing the handset transfer-data that has been converted by the handset transfer-data converter in such a way that the handset transfer-data includes transfer-destination handset information indicating a number of the handset selected by the transfer-destination handset selector;

wherein, when the handset transfer-data includes telephone directory data, the handset transfer-data converter resizes a thumbnail image data portion of the telephone directory data into an image size of a thumbnail usable in the transfer-destination handset.

9. A data transfer method of cordless telephone equipment including: at least one handset; and a base station of the handset, the base station being connected to a wireless IP-terminal by radio via a wireless LAN, the wireless IP-terminal instructing the base station to transfer handset transfer-data including image data or music data to the handset, the method comprising:

receiving by the base station, handset transfer-data including transfer-destination handset information from the wireless IP-terminal via a wireless LAN interface that transmits and receives packet data to and from the wireless IP-terminal, and storing by the base station, the handset transfer-data in a storage, the transfer-destination handset information indicating a transfer-destination handset number;

determining by the base station, a transfer-destination handset of the handset transfer-data based on the transfer-destination handset information of the handset transfer-data stored in the storage;

converting by the base station, the handset transfer-data into a data format usable in the transfer-destination handset according to a data type of the handset transfer-data; and transmitting by the base station, the handset transfer-data that has been subjected to the conversion to all transfer-destination handsets extracted in the determination by the base station; wherein when the handset transfer-data includes wallpaper data, the wallpaper data is realized into an image size of a wallpaper to be displayed on the transfer-destination handset.

10. A data transfer method of a cordless telephone system including: cordless telephone equipment including at least one handset, and a base station of the handset; and a wireless IP-terminal that is connected to the base station by radio via a wireless LAN, the method comprising:

transmitting and receiving by the wireless IP-terminal, packet data to and from the base station via a first wireless LAN interface;

selecting by the wireless IP-terminal, handset transfer-data to be transferred to the handset, from among data stored in a first storage;

selecting by the wireless IP-terminal, at least one handset as a transfer-destination of the handset transfer-data; and instructing by the wireless IP-terminal, the base station to transfer the handset transfer-data to a handset, by editing the handset transfer-data in such a way that the handset transfer-data includes transfer-destination handset information indicating a number of the handset selected by the selection of the transfer-destination handset, and transmitting the edited handset transfer-data to the base station, the method further comprising:

transmitting and receiving by the base station, packet data to and from an external wireless IP-terminal via a second wireless LAN interface;

receiving by the base station, the handset transfer-data from the wireless IP-terminal via the second wireless LAN interface and storing by the base station, the handset transfer-data in a second storage;

determining by the base station, a transfer-destination handset of the handset transfer-data based on the transfer-destination handset information of the handset transfer-data stored in the second storage;

converting by the base station, the handset transfer-data into a state usable in the transfer-destination handset according to a data type of the handset transfer-data; and transmitting by the base station, the handset transfer-data that has been subjected to the conversion by the base station to all transfer-destination handsets extracted by the determination by the base station; wherein when the handset transfer-data includes wallpaper data, the wallpaper data is realized into an image size of a wallpaper to be displayed on the transfer-destination handset.

11. A data transfer method in a cordless telephone system including: cordless telephone equipment including at least one handset, and a base station of the handset; and a wireless IP-terminal that is connected to the base station of the cordless telephone equipment via a wireless LAN, the method comprising:

selecting by the wireless IP-terminal, handset transfer-data to be transferred to the handset, from among data stored in a first storage;

selecting by the wireless IP-terminal, at least one handset as a transfer-destination of the handset transfer-data;

converting by the wireless IP-terminal, the handset transfer-data into a state usable in the transfer-destination handset; and editing by the wireless IP-terminal, the handset transfer-data that has been subjected to the conversion by the conversion by the wireless IP-terminal, in such a way that the handset transfer-data includes transfer-destination handset information indicating a number of the handset selected by the selection of the transfer-destination of the handset transfer-data, and transmitting the edited handset data by the wireless IP-terminal, and the method further comprising:

receiving by the base station, the handset transfer-data from the wireless IP-terminal and storing by the base station, the handset transfer-data in a second storage;

determining by the base station, a transfer-destination handset of the handset transfer-data based on the transfer-destination handset information of the handset transfer-data stored in the second storage; and transmitting by the base station, the handset transfer-data to the handset determined by the determination by the base station; wherein when the handset transfer-data includes wallpaper data, the wallpaper data is realized into an image size of a wallpaper to be displayed on the transfer-destination handset.

12. A data transfer method of cordless telephone equipment including: at least one handset; and a base station of the handset, the base station being connected to a wireless IP-terminal by radio via a wireless LAN, the wireless IP-terminal instructing the base station to transfer handset transfer-data including image data or music data to the handset, the method comprising:

receiving by the base station, handset transfer-data including transfer-destination handset information from the wireless IP-terminal via a wireless LAN interface that transmits and receives packet data to and from the wireless IP-terminal, and storing by the base station, the handset transfer-data in a storage, the transfer-destination handset information indicating a transfer-destination handset number;

determining by the base station, a transfer-destination handset of the handset transfer-data based on the transfer-destination handset information of the handset transfer-data stored in the storage;

converting by the base station, the handset transfer-data into a data format usable in the transfer-destination handset according to a data type of the handset transfer-data; and transmitting by the base station, the handset transfer-data that has been subjected to the conversion to all transfer-destination handsets extracted in the determination by the base station; wherein when the handset transfer-data includes telephone directory data, a thumbnail image data portion of the telephone directory data is realized into an image size of a thumbnail usable in the transfer-destination handset.

13. A data transfer method of a cordless telephone system including: cordless telephone equipment including at least one handset, and a base station of the handset; and a wireless IP-terminal that is connected to the base station by radio via a wireless LAN, the method comprising:

transmitting and receiving by the wireless IP-terminal, packet data to and from the base station via a first wireless LAN interface;

selecting by the wireless IP-terminal, handset transfer-data to be transferred to the handset, from among data stored in a first storage;

selecting by the wireless IP-terminal, at least one handset as a transfer-destination of the handset transfer-data; and instructing by the wireless IP-terminal, the base station to transfer the handset transfer-data to a handset, by editing the handset transfer-data in such a way that the handset transfer-data includes transfer-destination handset information indicating a number of the handset selected by the selection of the transfer-destination handset, and transmitting the edited handset transfer-data to the base station, the method further comprising:

transmitting and receiving by the base station, packet data to and from an external wireless IP-terminal via a second wireless LAN interface;

receiving by the base station, the handset transfer-data from the wireless IP-terminal via the second wireless LAN interface and storing by the base station, the handset transfer-data in a second storage;

determining by the base station, a transfer-destination handset of the handset transfer-data based on the transfer-destination handset information of the handset transfer-data stored in the second storage;

converting by the base station, the handset transfer-data into a state usable in the transfer-destination handset according to a data type of the handset transfer-data; and transmitting by the base station, the handset transfer-data that has been subjected to the conversion by the base station to all transfer-destination handsets extracted by the determination by the base station; wherein when the handset transfer-data includes telephone directory data, a thumbnail image data portion of the telephone directory data is realized into an image size of a thumbnail usable in the transfer-destination handset.

14. A data transfer method in a cordless telephone system including: cordless telephone equipment including at least one handset, and a base station of the handset; and a wireless IP-terminal that is connected to the base station of the cordless telephone equipment via a wireless LAN, the method comprising:

selecting by the wireless IP-terminal, handset transfer-data to be transferred to the handset, from among data stored in a first storage;

selecting by the wireless IP-terminal, at least one handset as a transfer-destination of the handset transfer-data;

converting by the wireless IP-terminal, the handset transfer-data into a state usable in the transfer-destination handset; and editing by the wireless IP-terminal, the handset transfer-data that has been subjected to the conversion by the conversion by the wireless IP-terminal, in such a way that the handset transfer-data includes transfer-destination handset information indicating a number of the handset selected by the selection of the transfer-destination of the handset transfer-data, and transmitting the edited handset data by the wireless IP-terminal, and the method further comprising:

receiving by the base station, the handset transfer-data from the wireless IP-terminal and storing by the base station, the handset transfer-data in a second storage;

determining by the base station, a transfer-destination handset of the handset transfer-data based on the transfer-destination handset information of the handset transfer-data stored in the second storage; and transmitting by the base station, the handset transfer-data to the handset determined by the determination by the base station; wherein when the handset transfer-data includes telephone directory data, a thumbnail image data portion of the telephone directory data is realized into an image size of a thumbnail usable in the transfer-destination handset.

15. A data transfer method of a cordless telephone system including: cordless telephone equipment including at least one handset, and a base station of the handset; and a wireless IP-terminal that is connected to the base station by radio via a wireless LAN, the method comprising:
- transmitting and receiving by the wireless IP-terminal, packet data to and from the base station via a first wireless LAN interface;
- selecting by the wireless IP-terminal, handset transfer-data to be transferred to the handset, from among data stored in a first storage;
- selecting by the wireless IP-terminal, at least one handset as a transfer-destination of the handset transfer-data; and
- instructing by the wireless IP-terminal, the base station to transfer the handset transfer-data to a handset, by editing the handset transfer-data in such a way that the handset transfer-data includes transfer-destination handset information indicating a number of the handset selected by the selection of the transfer-destination handset, and transmitting the edited handset transfer-data to the base station, the method further comprising:
- transmitting and receiving by the base station, packet data to and from an external wireless IP-terminal via a second wireless LAN interface;
- receiving by the base station, the handset transfer-data from the wireless IP-terminal via the second wireless LAN interface and storing by the base station, the handset transfer-data in a second storage;
- determining by the base station, a transfer-destination handset of the handset transfer-data based on the transfer-destination handset information of the handset transfer-data stored in the second storage;
- converting by the base station, the handset transfer-data into a state usable in the transfer-destination handset according to a data type of the handset transfer-data; and
- transmitting by the base station, the handset transfer-data that has been subjected to the conversion by the base station to all transfer-destination handsets extracted by the determination by the base station; wherein when the handset transfer-data includes telephone directory data, the telephone directory data is stored in the second storage as telephone directory data of the second storage.

16. A data transfer method in a cordless telephone system including: cordless telephone equipment including at least one handset, and a base station of the handset; and a wireless IP-terminal that is connected to the base station of the cordless telephone equipment via a wireless LAN, the method comprising:
- selecting by the wireless IP-terminal, handset transfer-data to be transferred to the handset, from among data stored in a first storage;
- selecting by the wireless IP-terminal, at least one handset as a transfer-destination of the handset transfer-data;
- converting by the wireless IP-terminal, the handset transfer-data into a state usable in the transfer-destination handset; and
- editing by the wireless IP-terminal, the handset transfer-data that has been subjected to the conversion by the conversion by the wireless IP-terminal, in such a way that the handset transfer-data includes transfer-destination handset information indicating a number of the handset selected by the selection of the transfer-destination of the handset transfer-data, and transmitting the edited handset data by the wireless IP-terminal, and the method further comprising:
- receiving by the base station, the handset transfer-data from the wireless IP-terminal and storing by the base station, the handset transfer-data in a second storage;
- determining by the base station, a transfer-destination handset of the handset transfer-data based on the transfer-destination handset information of the handset transfer-data stored in the second storage; and
- transmitting by the base station, the handset transfer-data to the handset determined by the determination by the base station; wherein when the handset transfer-data includes telephone directory data, the telephone directory data is stored in the second storage as telephone directory data of the second storage.

* * * * *